United States Patent
Chaudhari et al.

(10) Patent No.: US 11,386,462 B2
(45) Date of Patent: Jul. 12, 2022

(54) AUTOMATIC MODELING OF ONLINE LEARNING PROPENSITY FOR TARGET IDENTIFICATION

(71) Applicant: Microsoft Technology Licensing, LLC, Redmond, WA (US)

(72) Inventors: Sneha S. Chaudhari, Sunnyvale, CA (US); Mahesh S. Joshi, Belmont, CA (US); Gungor Polatkan, San Jose, CA (US); Deepak Kumar Dileep Kumar, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 16/782,054

(22) Filed: Feb. 4, 2020

(65) Prior Publication Data
US 2021/0241320 A1    Aug. 5, 2021

(51) Int. Cl.
| | |
|---|---|
| *G06Q 30/02* | (2012.01) |
| *G06Q 50/20* | (2012.01) |
| *G06N 5/04* | (2006.01) |
| *G06F 9/54* | (2006.01) |
| *G06N 20/00* | (2019.01) |
| *G06F 3/0484* | (2022.01) |
| *G09B 5/02* | (2006.01) |

(52) U.S. Cl.
CPC ......... *G06Q 30/0269* (2013.01); *G06F 9/542* (2013.01); *G06N 5/04* (2013.01); *G06N 20/00* (2019.01); *G06Q 30/0204* (2013.01); *G06Q 30/0255* (2013.01); *G06Q 50/205* (2013.01); *G06F 3/0484* (2013.01); *G06Q 30/0246* (2013.01); *G09B 5/02* (2013.01)

(58) Field of Classification Search
CPC .......... G06Q 30/0269; G06Q 30/0204; G06Q 30/0255; G06F 9/542
See application file for complete search history.

(56) References Cited

U.S. PATENT DOCUMENTS

| | | | |
|---|---|---|---|
| 10,037,546 B1* | 7/2018 | Benisch | G06Q 30/0248 |
| 2013/0311409 A1* | 11/2013 | Ye | G06N 20/00 706/12 |
| 2017/0061286 A1* | 3/2017 | Kumar | G06Q 30/0269 |
| 2019/0102701 A1* | 4/2019 | Singaraju | G06F 16/285 |

(Continued)

FOREIGN PATENT DOCUMENTS

EP    3038046 A1 *   6/2016   ......... G06Q 20/4016

*Primary Examiner* — Scott C Anderson
(74) *Attorney, Agent, or Firm* — Nicholson De Vos Webster & Elliott LLP

(57) ABSTRACT

In an embodiment, the disclosed technologies include determining a digital identifier, computing, using aggregate digital event data obtained from at least one computing device, digital feature data relating to the digital identifier, inputting the digital feature data relating to the digital identifier into a digital model that has machine-learned correlations between digital feature data and digital propensity prediction values, receiving, from the digital model, a predicted propensity value associated with the digital identifier, determining a propensity score based on the predicted propensity value, causing a digital content item to be displayed on a user interface of a network-based software application associated with the digital identifier if the propensity score satisfies a propensity criterion.

20 Claims, 6 Drawing Sheets

(56) References Cited

U.S. PATENT DOCUMENTS

| | | | |
|---|---|---|---|
| 2020/0034874 A1* | 1/2020 | Narayan | G06Q 30/0244 |
| 2020/0167448 A1* | 5/2020 | Modarresi | G06K 9/6271 |
| 2020/0380406 A1* | 12/2020 | Dickens | G06N 20/00 |

* cited by examiner

AUTOMATIC MODELING OF ONLINE LEARNING PROPENSITY FOR TARGET IDENTIFICATION

TECHNICAL FIELD

Technical fields to which the present disclosure relates include digital content delivery and entity management systems. Other technical fields to which this disclosure relates include online learning systems, machine learning and automatic propensity prediction.

BACKGROUND

Digital content delivery is the delivery or distribution of digital content such as text, audio, video, and images, over a medium such as the Internet. Methods of digital content delivery include email, electronic messaging, and "feed." A feed typically is subscription based; users register and then periodically receive digital content items on the feed by, for example, a web application or mobile app.

DETAILED DESCRIPTION

Figure 1:
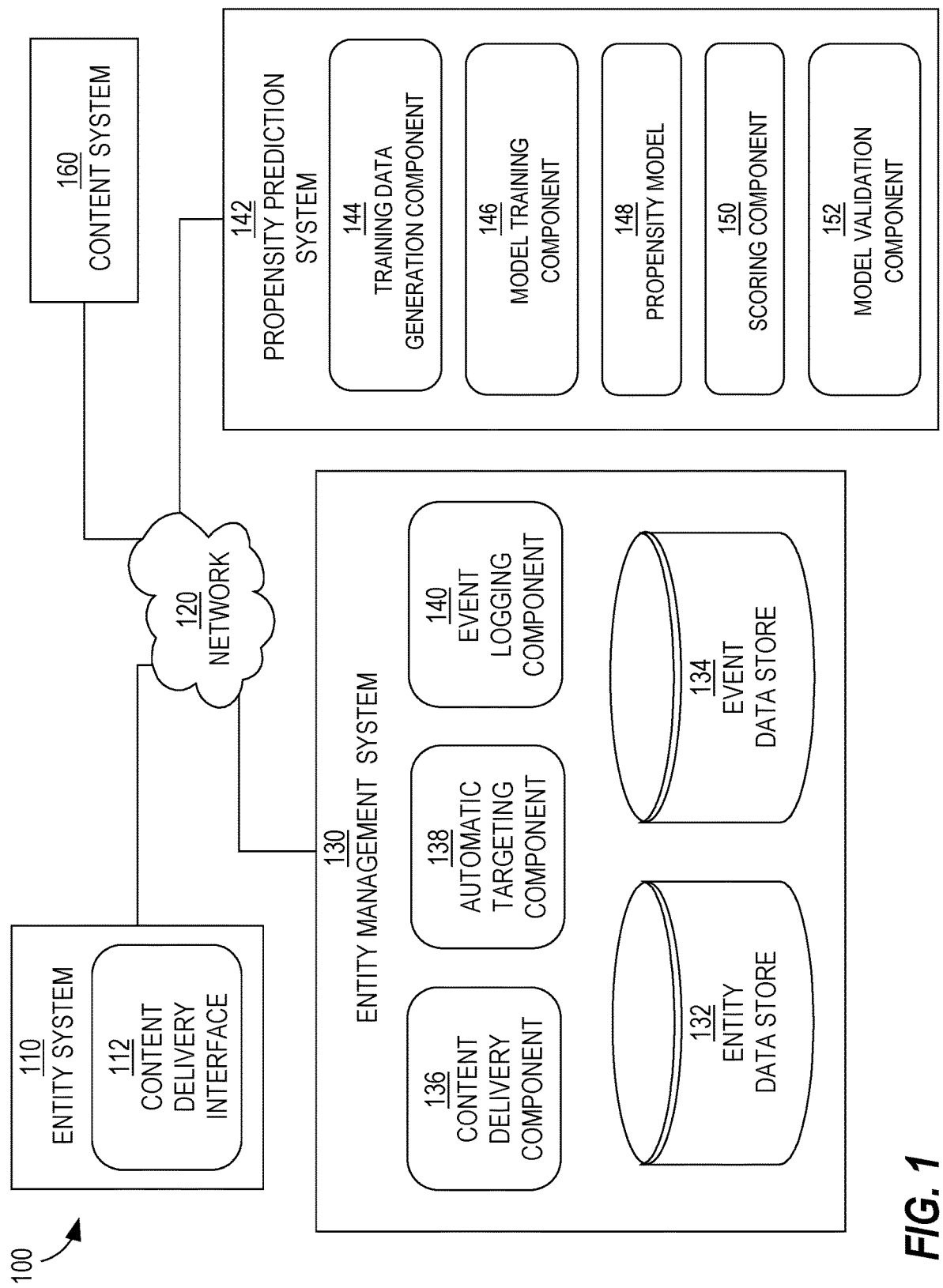
FIG. 1 is a block diagram of an example of a system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Prior computer-based approaches to determining target audiences for digital content delivery is that they are programmed using rules that tell the computer to include a user in a target audience if certain criteria are met or to exclude a user if the criteria are not met. For example, a target audience may be determined by whether potential audience users' demographic information matches criteria specified by computer code that expresses a rule. Rule-based approaches may be sufficient if there is a clear correlation between the criteria expressed by the rule and the target audience's affinity for particular digital activity. For example, people who have previously used an online service to purchase goods may predictably use an online service to purchase goods again.

However, a user's affinity for a particular category of digital activity sometimes is much harder to predict. For example, whether a user has previously purchased goods online may be a very poor predictor of a user's propensity for clicking on a "promo" such as a digital offer to subscribe to a particular category of online services. Promos are one example of a type of digital content item that may be referred to herein as a bi-lateral digital content item. A bi-lateral digital content item as used herein may refer to a digital content item that includes an offer to provide the recipient with access to certain otherwise inaccessible digital content and/or digital services, perhaps for a limited time, in exchange for the recipient providing data in response to the offer. Examples of data include, but are not limited to, click-through data, demographic information, survey responses, contact information and payment information. An example of a bi-lateral digital content item is a free trial.

Additionally, user affinity for some categories of digital content items may be harder to predict than for other content categories. For example, free trials for subscription-based online fitness programs may be strongly correlated with demographic information that is easy to express using rules, and therefore, amenable to the use of rule-based target audience identification. One the other hand, free trials for fee-based online learning programs, generally, may not have a strong correlation with any particular demographic that can be easily expressed using rules. Thus, attempts at audience targeting may be very difficult to implement programmatically using rules or the rule-based system may have a small likelihood of success in achieving the desired result of reaching users who are likely to sign up for the online service.

As audience targeting becomes more sophisticated or nuanced, the programming complexity of rule-based systems increases significantly and the computer code implementing the targeting rules becomes increasingly difficult to maintain and modify, particularly as audience data and digital content change over time.

Machine learning-based models have been used to identify target audiences for digital content. However, existing machine-learning based approaches rely on both historical user activity data and the particular digital content items for which a target audience is sought to be identified. Known model-based systems use the content of a particular online training course to determine whether to display a recommendation for that course to a particular user. For instance, for an online course in Python programming, the existing model-based system will take into consideration whether the user has previously accessed digital content relating to Python. In this example, "Python" is a feature that the system extracts from the digital content item itself.

These existing model-based approaches do not generalize well to situations in which particular features of the digital content are unknown. For example, a targeting system may seek to identify users who are interested in learning, generally, rather than users who are specifically interested in learning Python or some other particular subject matter. In this case, features of individual content items are less useful and may even result in an inaccurate propensity prediction. For example, that a user is interested in learning Python does not mean the user is also interested in learning about ancient Greece. Thus, one technical challenge is for model-based audience targeting systems to identify users who have a broad propensity or trait, such as "perpetual student" or "life-long learner," which is difficult to articulate or quantify and is not necessarily correlated with interest in any particular content item.

When there is not a strong correlation between targeting criteria and user propensity, or those correlations are unknown or ambiguous, a targeting system may conduct experiments using different targeting criteria in the alternative to see which criteria generate better results, as measured, for example, by click-through rate. Thus, different targeting criteria may be tested against each other; for example, one target audience may be defined by geographic location and another target audience may be defined by job title.

However, this approach becomes problematic when the targeting criteria does not produce mutually exclusive groups of users. For example, if a user matches both the "geographic region" criterion and the "job title" criterion, that user will be assigned to both the "geographic region" user group and the "job title" user group. When target user groups overlap, it is harder to determine which model produces better results. Thus, another technical challenge is to efficiently test and evaluate the performance of predictive models that have been created using targeting criteria that are different but which create user groups that are not mutually exclusive.

These and/or other limitations of known audience targeting systems are addressed by embodiments of the disclosed technologies. Embodiments build and use a digital model that has machine-learned math-based correlations between digital feature data and propensity predictions, where the digital feature data does not include digital content data, to automatically identify users of a network-based software application that are predicted to have a particular trait, such as a propensity for signing up for an online service or a propensity for digitally engaging with a broad category of digital content items.

Experimental results have shown that use of embodiments of the disclosed approaches can automatically identify a target user group for a particular type of digital content, successfully, where success is measured using a metric such as click-through rate. Embodiments also reduce or eliminate the need to programmatically create and maintain complex rule sets in order to express targeting criteria.

System Overview

FIG. 1 is a block diagram of an example system 100 for automatically identifying users of a target audience for digital content delivery using a machine-learned propensity model, in an embodiment. System 100 includes an entity system 110, a network 120, an entity management system 130, a propensity prediction system 142, and a content system 160. Entity system 110 is configured to communicate bidirectionally with at least entity management system 130 over network 120. Entity management system 130 is configured to communicate bidirectionally with at least propensity prediction system 142 and content system 160 over network 120.

Propensity prediction system 142 is configured to communicate bidirectionally with at least entity management system 130 over network 120. Entity management system 130 includes a content delivery component 136, an automatic targeting component 138, an event logging component 140, an entity data store 132, and an event data store 134, in an embodiment. Propensity prediction system 142 includes a training data generation component 144, a model training component 146, a propensity model 148, a scoring component 150, and a model validation component 152, in an embodiment.

System 100 or any of its component systems 110, 130, 142, 160 may include any number of client computers and/or server computers that interact with each other over network 120. For example, system 100 or any of its component systems 110, 130, 142, 160 may comprise multiple computing elements and devices that may be connected in a local network or distributed regionally or globally across many networks via the Internet. Although depicted in FIG. 1 as individual systems, all or portions of entity system 110, entity management system 130, propensity prediction system 142 and/or content system 160 may be part of the same overall system and may be provided or owned or managed by the same entity.

Portions of system 100 may be implemented as a web application. For example, a portion of system 100 may operate in entity management system 130 or propensity prediction system 142 and other portions may operate in a web browser executing on a client device, such as an entity system 110. In such embodiment, the web browser transmits a HTTP (Hyper-Text Transfer Protocol) request over a network (e.g., the Internet) in response to user input (e.g., entering of text and selection of a graphical button) that is received through a user interface provided by the web application and displayed through the web browser. Entity management system 130 or propensity prediction system 142 receives the input, performs one or more operations to conduct a search of, for example, content system 160, and returns one or more results to the client device in an HTTP response that the web browser receives and processes. Alternatively, a client-side application is installed and executes on a client device and is configured to communicate with entity management system 130 and/or propensity prediction system 142 over a network.

Entity system 110 interacts with entity management system 130; for example, by communicating queries, events, data and/or instructions to entity management system 130 and/or obtaining data and/or instructions from entity management system 130. Entity system 110 includes a content delivery interface 112. Content delivery interface 112 may be implemented as a user interface operable by one or more end users of entity management system 130 and/or as an application program interface (API) through which entity system 110 and/or other components and/or systems may interact with entity management system 130. For example, content delivery interface 112 may enable user interface events, such as views of and digital interactions with a feed that contains digital content items, where the digital content items may be stored in content system 160 and delivered to content delivery interface 112 by content delivery component 136.

In an embodiment, entity system 110 is a client device, such as a mobile computing device or a laptop computer, or a software application running on a client device, such as a web application or mobile app. In an embodiment, entity system 100 is a network-based software application; for example, an online system, a connection network system, or a social network application.

Typically, different users, for example users, of entity management system 130 access and use entity management system 130 via different entity systems 110. That is, while FIG. 1 shows only one entity system 110, system 100 may include any number of entity systems 110 and the number of entity systems 110 may correspond to or correlate with the number of users of entity management system 130.

Content system 160 includes a searchable store of digital content, which may be updated to include new items of content from time to time. Content system 160 may include online and/or offline data sources. Content system 160 may include web sites on the Internet; for example, web sites that publish news articles, blogs, comments, tweets, and reviews; social media pages, posts, and/or news feeds. In other embodiments, content system 160 includes bi-lateral digital content items relating to a particular category of content item. For example, content system 160 may include promos for content delivery applications or digital services offered by system 100, such as online learning courses. In some embodiments, content system 160 is an online learning system. Digital content within content system 160 can be searched and retrieved by, for example, a widget manager, an Internet search engine, an RSS (Really Simple Syndication) feed or a web crawler operated by content delivery component 136 cooperating with content delivery interface 112. Digital content can include, for example, digital images, videos, webinars, and online training courses.

As used herein, an example of a system is an application or a computing device or a combination of electronic devices or a combination of at least one application and at least one device. Examples of computing devices and electronic devices include server computers, laptop computers, tablet computers, smartphones, desktop computers, personal digital assistants (PDAs), wearable electronic devices, and smart appliances.

An example of an application is a native application that is installed on a particular type of computing device or configured to operate with a particular operating system. Another example of an application is a client application that is downloaded from a server computer and executes within web browser software running on a computing device. Another example of an application is a server application that runs on a server computer or on a network of server computers. An application may be implemented in hardware, software, or a combination of hardware and software. An application may include a data store or may be communicatively coupled to a data store. Thus, a system may include a combination of an application and a data store. As used herein, the term data store may refer to a logical data structure, such as a searchable database, an index, a table, a tree, or an electronic file, such as an HTML (Hypertext Markup Language) file or an XML (Extensible Markup Language) file.

Network 120 may be implemented on any medium or mechanism that provides for the exchange of data, signals, and/or instructions between component systems 110, 160, 130, 142 of system 100. Examples of network 120 include, without limitation, a Local Area Network (LAN), a Wide Area Network (WAN), an Ethernet network or the Internet, or one or more terrestrial, satellite or wireless links, or a combination of any number of different networks and/or communication links.

Although the various systems, data stores, components and devices are depicted in the figures and described as including certain features, all embodiments are not limited to requiring these features and some embodiments may include additional features not described herein. Further, the particular arrangement of systems, components, data stores, and devices shown in the drawings represents one example of an implementation. It will be understood that items shown as separate components, devices, systems, or data stores may be combined together in other implementations and that individual items may be further broken down into smaller elements or subsets of functionality in other implementations.

Entity Management System

In the embodiment of FIG. 1, entity management system 130 includes an entity data store 132, an event data store 134, a content delivery component 136, an automatic targeting component 138, and an event logging component 140. Although not specifically shown in FIG. 1, it will be understood that entity data store 132, event data store 134, content delivery component 136, automatic targeting component 138, and event logging component 140 are bidirectionally communicatively coupled as needed to perform the functionality of entity management system 130. Examples of components are applications, computer program modules, and code libraries. Examples of communicative coupling mechanisms include inter-process communication (IPC) interfaces and application program interfaces (APIs).

Entity data store 132 and event data store 134 each may reside on one or more persistent and/or volatile storage devices that may reside within the same local network as entity management system 130 and/or in a network that is remote relative to entity management system 130. Thus, although depicted as being included in entity management system 130, each data store 132, 134 may be separate from entity management system 130 and accessed by entity management system 130 over a network, such as network 120. Entity data store 132 stores data relating to entities, including entity identifiers.

Event data store 134 stores historical data relating to digital events detected and logged by event logging component 140, described below, as having been performed by an entity system 110 operated by an end user to interact with entity management system 130. Event data store 134 includes, for example, activity logs, which are data records of digital interactions of users with entity management system 130 and/or content system 160. In an embodiment, an event data record of an activity log includes at least a user identifier, a timestamp, and a description of the digital activity including any data entered by the user. Examples of activities include queries, clicks on digital content items or feeds, digital engagements with digital content items or feeds (for example, view, like, share, comment, play, expand), data entry events (such as entering payment information in response to a bi-lateral digital content item), registrations for particular features of system 100 (such as online courses or premium features), engagements with online courses, and completions of online courses.

Content delivery component 136 includes an interface that enables users and/or automated processes to receive copies of digital content items stored in content system 160 by, for example, a feed that is controlled by automatic targeting component 138. Thus, content delivery component 136 may provide a user interface and/or an API to allow users of entity management system 130 to receive, view, and interact with digital content items of content system 160. Examples of digital content items include but are not limited to online courses and digital promotional items relating to online courses.

Automatic targeting component 138 manages digital communications between content delivery interface 112, content delivery component 136, propensity prediction system 142, and content system 160. In an embodiment, automatic targeting component 138 determines a digital identifier associated with a user of an entity system 110 as a candidate for being shown, via content delivery interface 112, a digital content item in a particular category of interest, such as online learning. Examples of digital identifiers include but are not limited to usernames, device identifiers, session identifiers, network addresses, and any combination of any of the foregoing.

To identify the user as a candidate, automatic targeting component 138 provides the user's identifier data to propensity prediction system 142, and propensity prediction system 142 returns to automatic targeting component 138 a prediction of the user's propensity for digitally engaging with a digital content item in the particular category of digital content items. Propensity prediction system 142 determines the user's propensity prediction based on output of propensity model 148. As described in more detail below, propensity model 148 has been trained using training data that has been generated using digital content items in a particular category of interest.

Based on the propensity prediction received from propensity prediction system 142, automatic targeting component 138 determines whether to cause content delivery component 136 to deliver a digital content item from the particular category of digital content items to content delivery interface 112, such that content delivery component 136 either delivers the digital content item to content delivery interface 112 or does not deliver the digital content item to content delivery interface 112 based on the propensity prediction.

In an embodiment, content delivery interface 112 is a graphical user interface of a network-based software application, which includes a landing page that has a slot for displaying digital content items, such as digital content items of a particular category of bi-lateral digital items. For example, automatic targeting component 138 is implemented as a widget manager that, in conjunction with content delivery component 136, causes the digital content item to be displayed or not displayed in the slot on the landing page, in an embodiment.

In an embodiment, the slot may be assigned to digital content items relating to online learning services, exclusively, while other slots on the landing page may be assigned to other categories of digital content, exclusively. In another example, the slot may be assigned to digital content items related to online learning services, and other categories of digital content, non-exclusively. In the latter example, various categories of digital content each may be assigned a priority ranking, such that content categories with higher priority rankings may be permitted to use the slot more frequently than content categories with lower priority rankings. The priority rankings of the digital content categories with respect to a particular slot can be customized based on a user's propensity predictions.

Event logging component 140 logs data relating to digital events that occur within entity system 110 and/or entity management system 130 and/or content system while in operation; for example, logins, searches, and digital interactions relating to digital content made available to users of entity management system 130 via content delivery interface 112. Examples of digital interactions include but are not limited to views, likes, follows, tags, comments, and shares of digital content. Event logging component 140 stores event data relating to logged events in event data store 134. Event logging performed by event logging component 140 may be subject to user consent or otherwise restricted as may be required by any applicable laws, rules, regulations or policies.

In an embodiment, entity management system 130 is implemented as or includes an entity search and retrieval service that is supported by a connection network, where entity data may be stored using a connection graph. Examples of entities include but are not limited to a person, an organization (e.g., a company, a charity, a non-profit organization, a government agency, an alumni group, etc.), a group of people, or an association. Examples of connection networks include but are not limited to social network systems, professional connection network systems, and other software applications that store data pertaining to entities and indicate relationships or 'connections' between and among entities. In the illustrated implementation, entity data store 132 stores entity data records that include profile data and connection data associated with individual entities.

Some entity management systems are registration-based, in that users of the entity management system may register by providing digital credentials, such as a username and password. In this disclosure, aspects of the technologies disclosed herein as applicable to users are considered applicable to both unregistered users and registered users. However, certain aspects of the disclosed technologies may be applicable only to registered users. For example, user features used to train a propensity model and to obtain propensity predictions using the propensity model may be collected only for users who have consented to such uses of those features and may not be available for unregistered users.

Profile data for a person may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user. Profile data of an organization, such as a company, may include a company name, an address of the company, a number of employees, a listing of principals or chief executives of the company, a description of any current job openings, and a description of products or services provided by the organization.

Profile data can also include derived or computed data that, with the user's consent as may be required by applicable laws, rules, or regulations, is collected and stored, for example by event logging component 140, based on actions that the user has taken within entity management system 130. Profile data can also include connection data. Connection data for an entity may be implemented as a data record that includes an entity identifier of another entity and a date/timestamp indicating the date and time that a connection with the other entity was made. For example, entity management system 130 may create a connection between a person entity and an organization entity when the user represented by the person entity in entity management system 130 registers for a service provided by the organization, such as an online training course.

A user of entity management system 130 may correspond to one or more entities that are stored in entity data store 132, where an entity has an associated digital identifier that distinguishes that entity uniquely from other entities. For example, a single user may create multiple different entities within entity management system 130, each with a same or similar name or title but targeted to a different purpose, interest, or audience. Alternatively or in addition, a representative of an organization may create an entity within entity management system 130 that represents the organization and has an associated profile so that other users can learn about the organization, follow the organization, and/or subscribe to messages and notifications issued by and/or about the organization. A representative of an organization also may create an entity within entity management system 130 that represents an application or service offered by the organization, which has an associated profile so that users can learn about the application or service, sign up for the application or service and/or subscribe to the application or service.

Events include digital actions that may be taken by a user, for example via a user account registered within entity management system 130, such as creating and executing searches, posting or submitting content for consideration by other entities, viewing and engaging with feeds and/or content posted by other entities, viewing entity profile pages, exchanging messages with other users, commenting on content posted by other users, and following entities. Entity management system 130 may prompt users to perform actions via content delivery component 136. For example, content delivery component 136 may include a push notification service that causes periodic displays of content or content-related notifications such as promos. The notifications generated by content delivery component 136 may be targeted to particular users or groups of users.

Propensity Prediction System

In the embodiment of FIG. 1, propensity prediction system 142 includes a training data generation component 144, a model training component 146, a propensity model 148, a scoring component 150, and a model validation component 152. Although not specifically shown in FIG. 1, it will be understood that training data generation component 144, model training component 146, propensity model 148, scoring component 150, and model validation component 152 are bidirectionally communicatively coupled as needed to perform the functionality of propensity prediction system 142.

Training data generation component 144 when executed by one or more processors generates training data that are used by model training component 146 to create propensity model 148, as disclosed herein. Training data generation component 144 extracts and/or computes, for each user in a set of users of entity management system 130 (who typically access entity management system 130 through different entity systems 110), a corresponding set of digital feature data. User-related digital feature data include or are derived from entity data extracted from entity data store 132 and/or event data extracted from event data store 134, for at least one other user. The number of users for which entity and/or event data is extracted or derived typically is very large; for example in the range of thousands to millions and even to hundreds of millions of users of entity management system 130. Thus, training data generation component 144 is implemented as an automated process, which is not practical for a human to perform.

Digital feature data are user-specific as opposed to being content-specific. For example, content-specific meta data such as title, author, publication date, keywords, abstract, etc., generally are not included in the training data generated by training data generation component 144. Rather, user-specific digital signals that are derived from the users' digital activity in entity management system 130 are included in the training data generated by training data generation component 144. Specific examples of user features are described in more detail below.

Digital feature data for a particular user includes, in some embodiments, at least one feature that is derived from aggregate feature data that is computed using digital event data of at least one other user. In one example, training data generation component 144 queries event data store 134 for online course completion data for users who are similar to a particular user. Similar as used herein may refer to at least two users who have at least one item of profile data in common as determined by a matching algorithm. Once a set of similar users has been found based on matching profile data, training data generation component 144 counts the number of online courses that have been digitally engaged with or completed by the similar users, as indicated by the digital event data. If, for example, the count of online courses completed by similar users exceeds a threshold value, the "similar users courses completed" feature for the particular user may be set to 1, and if the count of online courses completed by similar users does not exceed the threshold value, the "similar users courses completed" feature for the particular user may be set to 0. Similar feature computations may be done for other types of similar user features. Thus, in this way, event and/or profile data of other users may, in the aggregate, be used to compute feature values for a particular user. Additional examples of user features are described in more detail below.

After a set of features is generated for a user, including any features derived from aggregate feature data as described above, training data generation component 144 assigns a label to the set of user features. Thus, at any given time, a user has a set of user features and a label. A user's set of user features may change over time, for example as the user performs more digital interactions with entity management system 130. Newly generated user features may be added to an existing set of user features, or new sets of user features may be generated and assigned new labels over time.

To determine which label to assign to a particular set of user features, training data generation component 144 uses an experimentation process such as a supervised machine learning process. In an embodiment, experiments are conducted in which users are selected and are each shown test examples of digital content. Training data generation component 144 may use more than one technique for selecting users to be participants in the experiments. In an embodiment, training data generation component 144 uses one or both of random targeting of users and a contextual unlocking experiment. In a contextual unlocking experiment, users are shown a digital content item, such as "courses you may be interested in" and the users' digital interactions in response to the display of the bi-lateral digital content item are recorded, analyzed, and collectively labeled as either a positive training example or a negative training example.

A positive label indicates that a user's digital interactions correlate with a high propensity to engage with digital content items of the same category as the test sample. A negative label indicates that a user's digital interactions correlate with a low propensity to engage with digital content items of the same category as the test sample. An embodiment of a process that may be used by training data generation component 144 to generate training data is described in more detail below with reference to FIG. 3.

Training data generation component 144 outputs training data that includes, in an embodiment, for each user identifier in a user data set, a label and a corresponding set of user features. The set of user features includes, for example, user profile data, user event data, and user-to-user similarity features, where user-to-user similarity features may refer to features derived from aggregate event data of other users, as discussed above.

Examples of user profile data include any of the various types of data that may be input by the user and stored in entity data store 132, described above, or derived from data stored in entity data store 132, for a particular user. For instance, user profile data may include the user's current job title, level of seniority, education, and skills. Examples of user event data include any of the various types of data that may be stored in event data store 134, described above, or derived from data stored in event data store 134, for a particular user. For instance, user event data may include an indication of whether the user has in the past subscribed to a fee-based online service through entity management system 130, such as an online course or a premium usership. User event data also can include aggregate event data, such as a count of digital interactions by the user during a time interval, or a count of digital impressions shown to the user during a time interval, or a count of the number of searchers of a particular type, for example job searches, conducted by the user during a time interval.

A difference between user-to-user similarity features and other types of user features is that user-to-user similarity features reflect a comparison of the user's digital activity to the digital activity of other users using entity management system 130, while other user features reflect the user's own digital activity without reference to other users. Thus, a user feature may be a count of online course views or a count of online course completions by a particular user, while a user-to-user similarity feature may be a count of online course views and completions by at least one other user who is considered similar to the user in some way.

As mentioned above, similarity between users is determined computationally using, for example, a matching algorithm. For example, a matching algorithm may perform pairwise comparisons of profile data of two different users. If any one or more items of profile data match exactly or implicitly, the matching algorithm may output an indication of a positive match. An implicit match may occur when, for example, an item of profile data for one user does not exactly match a corresponding item of another user but contains the same words arranged in a different order, or contains a majority of the same words, or contains a synonym of a word in the profile of the other user.

In an embodiment, user-to-user similarity features include features that are computed by, for a particular user, identifying similar users of entity system 110. Similar users are identified, for example, based on matching entity profile data (such as similar job title, education, or geographic location, or common connections) and/or matching event data (such as similar searches or content views). Once a set of similar users is identified, event data for the at least one user in the set of similar users, logged by event logging component 140 and stored in event data store 134, is analyzed to determine whether the similar user(s) have engaged in any digital activity within entity system 110 that may be considered a predictor of the particular user's interest in a particular category of digital content items.

To illustrate, in an embodiment, a category of digital content items is promotions for an online learning service. In this context, user-to-user similarity features (or simply, "user similarity features") may include indications of whether or the degree to which similar users have, in the aggregate, viewed, clicked, shared, liked, commented on, registered for, completed, or otherwise digitally engaged with any online courses through the online learning service. When used as training data, a user's quantity and/or type of digital activity associated with use of an online learning service may be used by propensity model 148 to generate a propensity prediction; for example a probabilistic likelihood that a similar user will similarly digitally engage with a the online learning service.

User features can include both user similarity features and other types of user features. Online learning services is a category of digital content items that is used herein for illustrative purposes. However, it should be understood that the disclosed technologies are applicable to many different categories of digital content items, including but not limited to online courses and online learning services.

In some embodiments, there is a distinction between machine learning-based finding of correlations of sets of user features to content categories (such as promos for online learning, generally), on the one hand, and machine learning-based finding of correlations of sets of user features to particular items of digital content (such as promos for specific online courses), on the other hand. In the first case, there may be many fewer labeled examples, making it more difficult for the model to establish reliable correlations. However, the inclusion of user similarity features in the training data has been shown to improve the accuracy of the correlations established as a result of model training; thereby improving the quality of the propensity model output.

In embodiments in which propensity model 148 models correlations between sets of user features and content categories as opposed to correlations between sets of user features and particular items of digital content, the specific characteristics of any particular digital content item in the category are not used to train the model and are input to the model at run time, because any content item in the category could be shown to any user at any time. For this reason, in some embodiments, propensity model 148 is trained only on user features and not jointly on user features and content features. That is, in some embodiments, only user features (and not features of the individual digital content items) are used to train propensity model 148.

Model training component 146 inputs training data generated by training data generation component 144, e.g., sets of features and corresponding labels, to a machine learning-based modeling process to produce propensity model 148. In an embodiment, model training component 146 applies a gradient boosting (GBT) algorithm to the training data generated by training data generation component 144, and the output of the GBT algorithm is used to produce propensity model 148. In some embodiments, model training component 146 uses the output of the GBT algorithm as training data input to a linear regression (LR) model, and the output of the LR model is then used to produce propensity model 148. In other embodiments, a standard LR algorithm is applied to the training data generated by training data generation component 144 and the output of the LR algorithm is used to produce propensity model 148.

Propensity model 148 is produced by model training component 146. Once trained, propensity model 148 contains coefficients that represent mathematical correlations between sets of training data (i.e., user features) and labels, which indicate the corresponding propensity predictions. In operation, in an embodiment, a user's user identifier is used to extract or compute user features when a user logs in to entity system 110, and then the trained propensity model 148 uses those features determined at user login time to produce a propensity prediction for the user at the user login time.

User features may be computed and stored, for example in entity data store 132, periodically by an online or offline process, so that the user features are available when a propensity prediction is needed. For instance, in an online environment, in response to a user viewing a landing page, features previously or recently computed for that user may be retrieved from memory and input to propensity model 148 to produce a propensity prediction that then can be used to determine whether to display a digital content item of a particular category of content items to that user on the landing page at that time. A user's set of user features, or the values of those features, may change over time, and thus, the user's propensity prediction may change over time as well. For instance, as a user's engagement data changes, the user's propensity prediction may change in a related way.

In operation, the trained propensity model 148 correlates a user's set of user features (meaning, the user's particular data values for each of the user features) with a propensity prediction value. Propensity model 148 computes the propensity prediction value using a machine learning algorithm and parameters selected and learned during the model training process. Propensity model 148 outputs the propensity prediction value for use by scoring component 150 or directly by automatic targeting component 138. In general, model as used herein may refer to a combination of computer programming code in which one or more decision-making algorithms are expressed; i.e., a machine learning algorithm, and one or more computer-implemented data structures that store data and/or parameters used by the model, including the data and/or parameters.

Scoring component 150 generates propensity scores for users based on the users' individual propensity prediction values, which have been produced by propensity model 148. In an embodiment, the propensity scores are integer values; for example scoring component 150 converts the propensity prediction values output by propensity model 148 into binary decision values that can be used by automatic targeting component 138 to quickly determine whether or not to show a particular content item to a particular user at a particular time. An exemplary approach for converting propensity values to propensity scores is described in more detail below. In an embodiment, scoring component 150 is implemented as an automated, periodic process that computes propensity scores for all users of a user data set on a recurring basis, such as daily. Propensity scores produced by scoring component 150 may be stored in, for example, entity data store 132.

Model validation component 152 tests each iteration of propensity model 148 against a baseline model. Model validation component 152 determines whether the audience targeting performed using the propensity predictions output by a particular iteration of propensity model 148 achieves better results than audience targeting performed using the baseline model. In an embodiment, an initial baseline model is established using random targeting; that is, users are randomly selected for content delivery and content delivery is not based on any knowledge of prior interactions of any of the users of entity system 110. In other embodiments, an initial baseline model may be established using a rule-based approach, if applicable. However, in cases where there is no basis for designing a rule-based approach (no data to indicate a correlation between any particular rule-based criteria and particular outcomes), the random targeting approach is used to validate the initial iteration of propensity model 148. After the initial iteration, subsequent versions of propensity model 148 are validated against prior versions of propensity model 148. One or more parameters of propensity model 148 may be modified based on the results of any iteration of validation testing. In an embodiment, propensity model 148 is validated, on the initial iteration and subsequent iterations, using an AB testing technique.

Overview of Propensity Prediction Process

Figure 2:
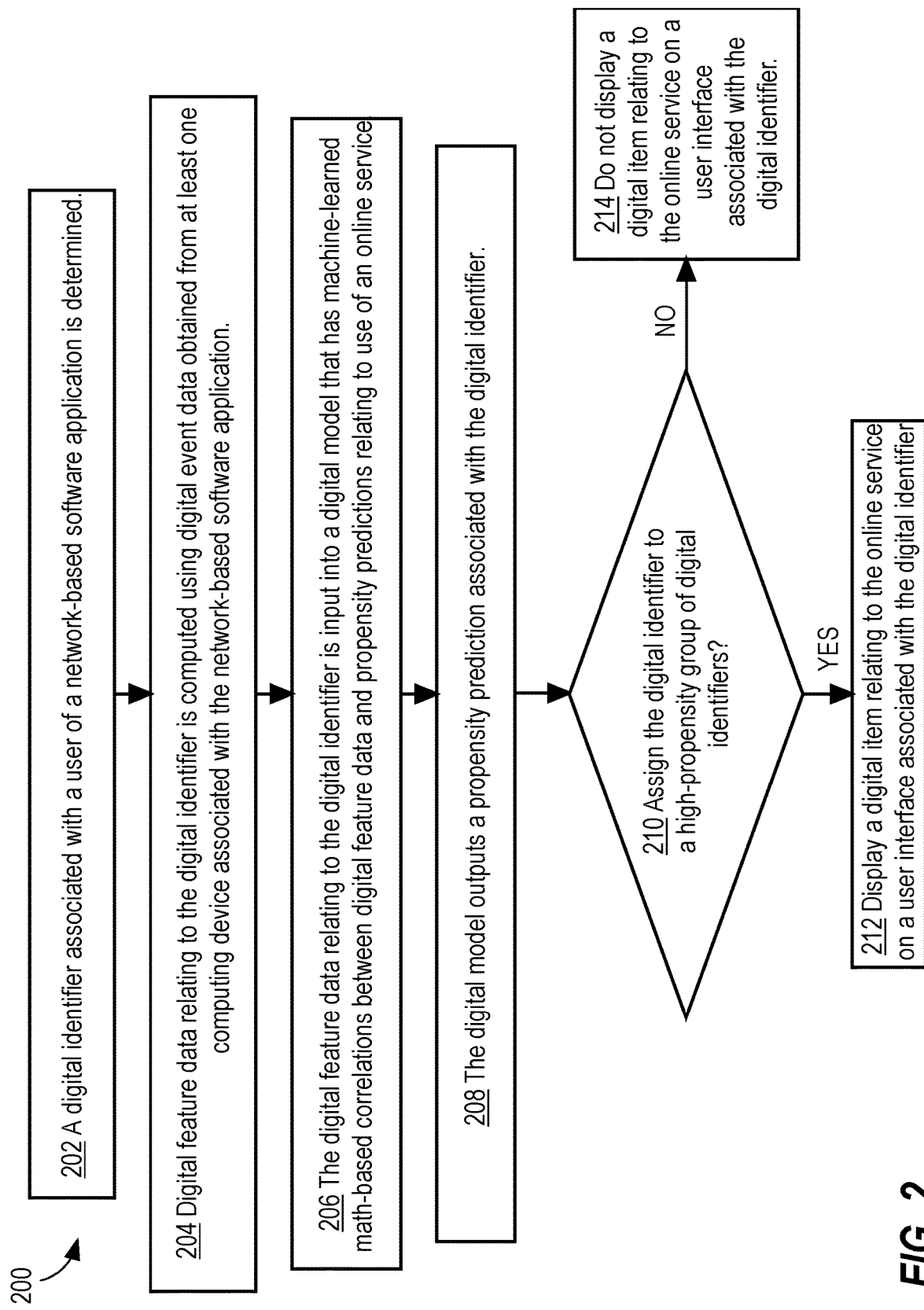
FIG. 2 is a flow diagram that depicts an example process, which may be performed by one or more components of the system of FIG. 1, in an embodiment.

FIG. 2 is a flow diagram that depicts an example process 200 by which system 100 may generate a propensity prediction value and execute downstream operations based on the propensity prediction value, in an embodiment. Process 200 may be implemented by at least one computing device; for example, one or more different components of system 100, such as one or more components of propensity prediction system 142 alone or in combination with one or more components of entity management system 130, content system 160 and/or entity system 110.

For ease of discussion, process 200 is illustrated and described using a number of functional blocks. It will be understood, however, that this disclosure is not limited to the particular arrangement and description of the functional blocks of process 200. In addition, it will be understood that the functional blocks of process 200 can include functionality that is described elsewhere in this disclosure; for example, functionality described as being performed by system 100 or one or more of the systems or components of system 100.

In operation 202, a user, such as a user of a network-based software application, such as an online system, is identified as a candidate for being shown, via a user interface of the online system, a digital item in a category of bi-lateral digital items, and the user's digital identifier is determined. In an embodiment, operation 202 includes detecting that the user has logged in to the online system, or detecting that the user is viewing a particular page of a web application, such as a landing page, and determining the digital identifier associated with that activity. In other embodiments, operation 202 may involve an analysis of the user's profile data to determine if the user falls into a particular demographic of interest. Thus, in some embodiments, the disclosed approaches may be used to supplement rather than replace rule-based approaches to identifying target audiences.

In operation 204, at least one user feature is computed for the user identified in operation 202 using, at least, digital event data obtained from at least one computing device associated with the network-based software application. User features may include, for example, a combination of profile data and event data obtained from the online system. Illustrative, non-limiting examples of user features are described above.

In an embodiment, operation 204 includes generation of user similarity features. To do this, operation 204 uses user profile data associated with the user identified in operation 202 to query entity data store 132 to identify at least one similar user of the network-based software application, based on at least one matching profile data, and computes at least one user similarity features for the identified at least one similar user. For example, in a professional social network context, similar users may have similar job titles, work experience, connections, or education, or a combination of similar profile data.

Once a set of similar users is identified, operation 204 computes user similarity features by querying the event data store 134 to determine whether event data store 134 contains any event data that evidences any of the user similarity features for any of the identified similar users. For example, querying data store 134 may indicate that a set of similar users have recently completed an online course. In an embodiment, operation 204 outputs a data value, such as a positive integer, for each user similarity feature that is determined to be present for at least one identified similar user. For example, the value for a user similarity feature, SimilarUsersCourseCompletions may be the count of the number of similar users who have completed online courses through entity management system 130, or, as described above, may be a binary value that is derived from such count value. Similarly, a value for a user similarity feature, SimilarUsersFeedCommentSameCourse, may be a count of the number of similar users who all commented on the same course recommendation for a course offered through an online learning service, when that course recommendation appeared in their feed, or may be a binary value derived from such count value.

To compute other user features, operation 204 queries the event data store 134 to determine whether event data store 134 contains any event data that evidences any of the other user features for the user identified in operation 202. For example, querying event data store 134 may indicate that the user has recently completed an online course. In an embodiment, operation 204 outputs a data value, such as a positive integer, for each user feature that is determined to be present for the user. For example, the value for the user feature, UserCourseCompletions may be the count of the number of online courses completed by the user through the system 100. Similarly, the value for the user feature, UserFeedCourseInteraction, may be a binary value indicating whether the user interacted digitally with any online course-related item that appeared in the user's feed.

In operation 206, the at least one user feature computed in operation 204 is input into a propensity model that has machine-learned correlations between user features and predicted propensities for the category of digital content items. Based on the user features from operation 204, the propensity model outputs a predicted propensity value for the user identified in operation 202. In an embodiment, the predicted propensity value is implemented as a probabilistic value, such as a real number between zero and one, inclusive, where a value closer to 1 indicates a higher likelihood that the user identified in operation 202 may digitally engage with items in the category of digital content items (for example, digital content items relating to an online learning service), and a value closer to 0 indicates a lower likelihood that the user identified in operation 202 may engage with items in the category of digital content items.

In operation 208, the user's predicted propensity for digitally engaging with a digital item in a category of digital items is determined using output of operation 206. In an embodiment, the propensity model output; that is, the predicted propensity value produced by operation 206, is converted by operation 208 to a predicted propensity score.

In an embodiment, the predicted propensity score is a binary decision value, such as 0 or 1, where 0 indicates low propensity and 1 indicates high propensity. To determine the predicted propensity score, operation 208 maps the real-number predicted propensity values produced by operation 206 to propensity buckets. In an embodiment, a percentile-based bucketing system is used to define the propensity buckets. The propensity buckets can be defined programmatically according to the requirements of a particular design or implementation.

For instance, in one implementation there are only two propensity buckets, high and low, and the threshold for a propensity value being assigned to the high bucket is that the propensity value (e.g., a probabilistic value between 0 and 1) is in the top 15% of all propensity values of all users for whom the propensity value was computed during a given time interval. So if a user's propensity value is 0.5, but 85% of all users for whom the value has been computed have a propensity value greater than 0.5, the user is assigned to the low propensity bucket and user's propensity score will be 0. If on the other hand the user's propensity value is 0.8, and only 14% of all users for whom the value has been computed have a propensity value greater than 0.8, then the user is assigned to the high propensity bucket and user's propensity score will be 1.

In another example, users having predicted propensity values that are in the top k percentile of all scored users are assigned a propensity score of 1 and placed in the high propensity bucket, while all other scored users are assigned a propensity value of 0 and placed in the low propensity bucket. Examples of top k include but are not limited to the top 50% or higher; e.g., greater than the propensity score for at least a majority of all other scored users. The threshold value of k for determining whether a propensity score is in the top k percentile may be determined or adjusted based on the requirements of a particular design or implementation of system 100.

The binary score produced by some embodiments of operation 208 can make it easier for an online system to make real-time decisions as to whether or not to show particular content to the user; for example whether or not to include a digital content item in a particular user's feed. However, in other embodiments, operation 208 may simply determine and use the propensity model output; e.g., the probabilistic value, without converting it to a score. In any case, the predicted propensity produced by operation 208 is evaluated in operation 210.

Operation 210 evaluates the user's predicted propensity, as produced by operation 208, and determines whether the user is in a target audience for the category of digital content items modeled by the propensity model. If the user is in the target audience; for example, the user's propensity score is 1, process 200 proceeds to operation 212. In operation 212, a digital content item from the category of bi-lateral digital content items modeled by the propensity model is displayed on the user's user interface, e.g., content delivery interface 112 of a network-based software application on the user's device. If the user is not in the target audience; for example, the user's propensity score is 0, process 200 proceeds to operation 214. In operation 214, no action is taken; that is, a digital content item from the category of digital content items modeled by the propensity model is not displayed on the user's user interface.

The above-described examples of propensity value and propensity score computations can be implemented programmatically, for example using Boolean logic expressed in computer code. Propensity value and/or propensity scores can be computed each time an opportunity to display a digital content item to a user is triggered (e.g. by a user login or viewing of a news feed). Alternatively or in addition, propensity value and/or propensity scores may be computed at periodic time intervals, such as daily or weekly, for example by an offline process that computes these values for all users.

Overview of Training Data Generation Process

Figure 3:
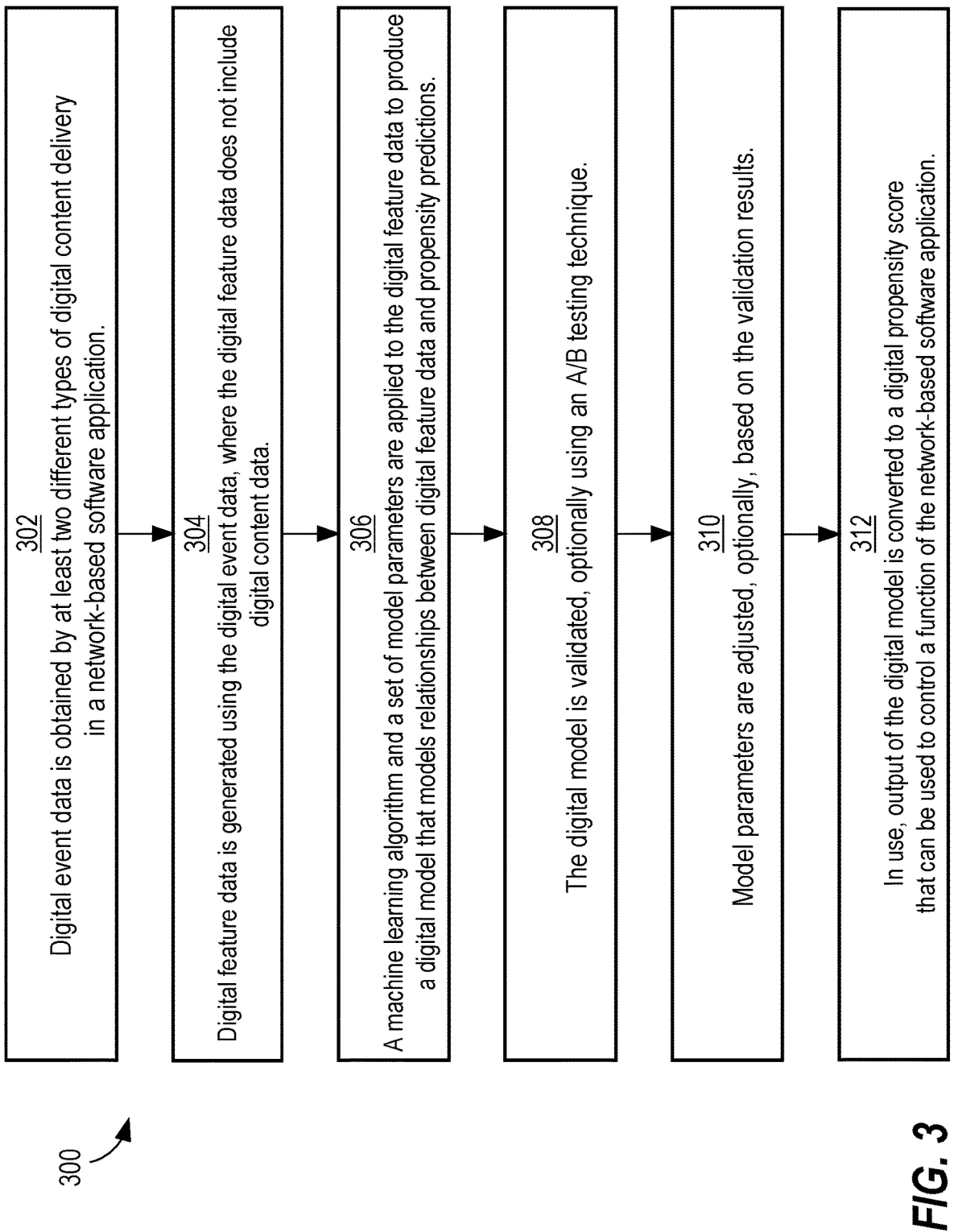
FIG. 3 is a flow diagram that depicts an example process, which may be performed by one or more components of the system of FIG. 1, in an embodiment.

FIG. 3 is a flow diagram that depicts an example process for generating training data to be used to produce a propensity model, which may be performed by at least one component of the system of FIG. 1, in an embodiment. Process 300 may be implemented by at least one computing device; for example, one or more different components of system 100, such as one or more components of propensity prediction system 142 alone or in combination with one or more components of entity management system 130, content system 160 and/or entity system 110.

For ease of discussion, process 300 is illustrated and described using a number of functional blocks. It will be understood, however, that this disclosure is not limited to the particular arrangement and description of the functional blocks of process 300. In addition, it will be understood that the functional blocks of process 300 can include functionality that is described elsewhere in this disclosure; for example, functionality described as being performed by system 100 or one or more of the systems or components of system 100.

In operation 302, digital event data is obtained by at least two different types of digital content delivery in a network-based software application. In an embodiment, positive and negative training examples are collected by system 100 conducting at least two different types of experiments on users, for example sets of users, of entity system 110. In an embodiment, labels are collected using random targeting, where user identifiers are randomly selected, a "test" digital content item is shown to those users, and event data following the display of the test digital content item to the users is collected and analyzed to determine whether the users' respective digital activity in response to viewing the test digital content item indicates a propensity to engage with digital content in the same category as the digital content item. A high propensity may be indicated by, for example, a click on the item.

The combination of user identifier and a high propensity score is considered a positive example. Likewise, a low propensity may be indicated by, for example, scrolling past the digital content item. The combination of user identifier and a low propensity score is considered a negative example. Alternatively or in addition, labels may be collected by conducting a contextual unlocking experiment using the feed. Contextual unlocking involves placing a digital content item in the feed, where the digital content item contains a button or other interactive feature that if clicked, "unlocks" additional content or features. In one example, the digital content item is a "view content for free" button that if clicked, unlocks fee-based content (such as an online course) for a limited time, such as x hours. In this case, a user's digital activity in response to receiving the digital content item in his or her feed is analyzed to determine whether the combination of user identifier and propensity score is considered either a positive example or a negative example.

In operation 304, digital feature data is generated using the digital event data, where the digital feature data does not include digital content data. For example, user features are generated and added to the training examples, using event data obtained from the online system but not using any features derived from digital content items. In an embodiment, one or more user features are added to the positive and negative examples generated by operation 302. User features are extracted from, for example, entity data store 132 and/or event data store 134. User features may include user similarity features, such as similar user course completions, or similar user digital activity more generally.

In operation 306, a machine learning algorithm and a set of model parameters are applied to the digital feature data to produce a digital model that models relationships between digital feature data and propensity predictions. For example, a machine learning algorithm and a set of model parameters are learned from the training examples output by operation 304 to produce a propensity model which contains a set of learned parameters that represent correlations between training data and labels. Examples of machine learning algorithms that may be used to create the propensity model include logistic regression, boosting algorithms such as gradient boosted trees, and XGBoost. Different algorithms and algorithm parameters may be tested in order to determine a best performing model given the desired success criteria.

In operation 308, the propensity model is validated, optionally using an A/B testing technique in which performance of the propensity model is compared to the performance of a baseline model (such as random targeting). In an embodiment, both offline and online performance metrics are used to compare the propensity model's performance to the performance of the baseline model. An example of an offline metric is AUC (area under curve). An example of an online metric is CTR (click-through rate).

In an embodiment, operation 308 includes programmatically validating the digital model using an A/B testing technique and training data sets, where the training data sets are not mutually exclusive. To do this, the A/B testing technique is configured for the training data sets that are not mutually exclusive. For example, the A/B testing technique may be modified so that rather than performing one iteration of A/B testing, operation 308 may perform two or more iterations of A/B testing using a hash ID to keep track of user identifiers across the multiple iterations.

In operation 310, model parameters are adjusted, optionally, based on the model validation results produced by operation 308. In an embodiment, model parameters that are adjusted include, using a GBT-based model, number of trees, maximum tree depth, and learning rate. Other model parameters that may be adjusted include lambda (regularization), and gamma (min loss for split). In an embodiment, reducing the number of trees and/or reducing the maximum tree depth and/or reducing the learning rate improves the model performance. In general, model parameter adjustments are based on the requirements of a particular design or implementation of system 100.

In operation 312, once the model has been trained and validated, the model can be put into use by a content delivery system, such as an online system. In use, output of the model is produced in response to input of user features. The model output may be converted to a propensity score that can be used to control a function of the content delivery system, e.g., the online system. As described above with reference to FIG. 2, the propensity score may be a binary value that a widget manager, for example, can use to quickly determine whether to show or not show a digital content item to a particular user; for example, by placing or not placing the digital content item in the user's feed.

Examples of Propensity Scores

Figure 4A:
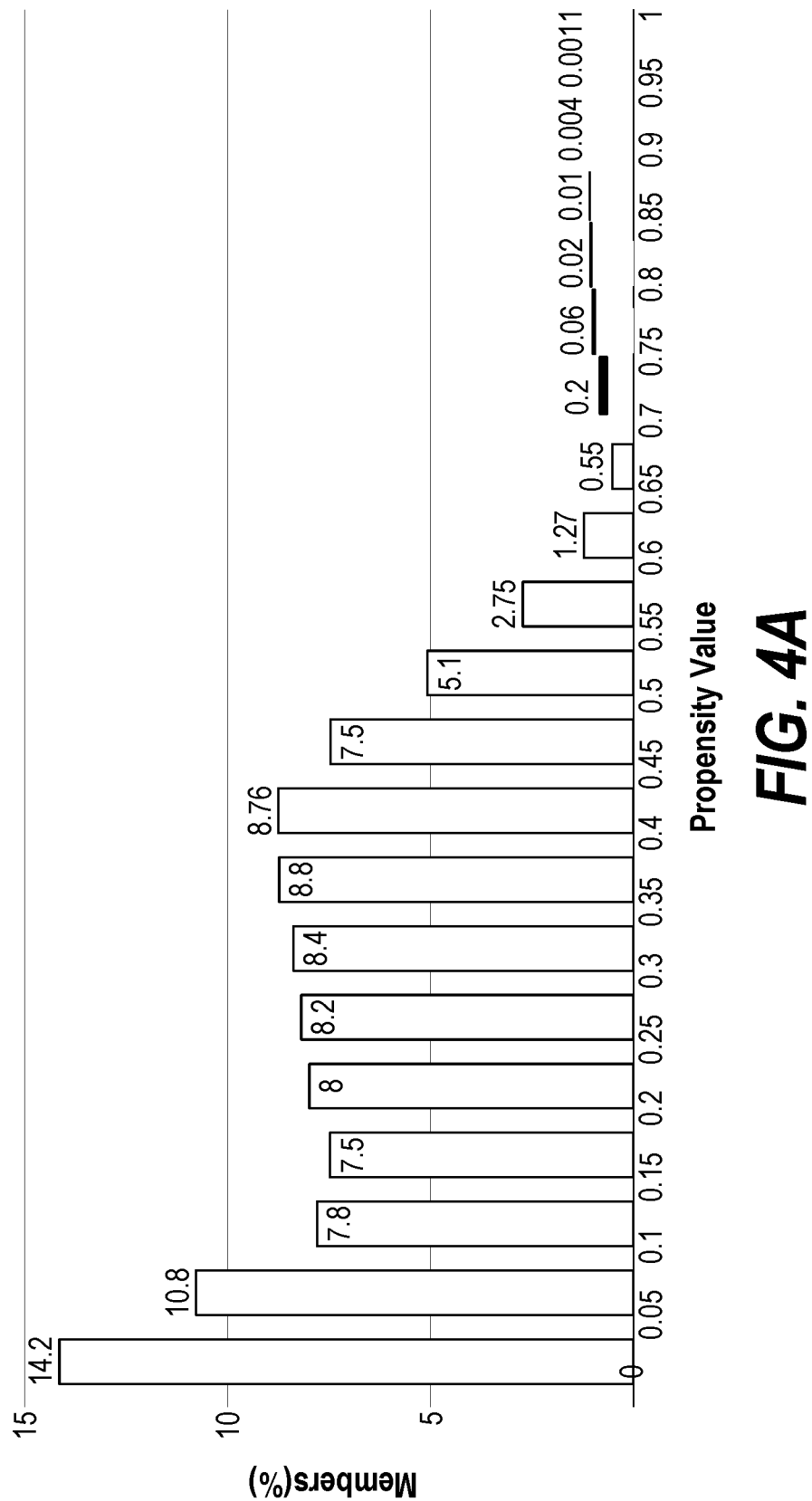
FIG. 4A is a plot that depicts an example of propensity scores, which may be produced by one or more components of the system of FIG. 1, in an embodiment.

FIG. 4A is a plot that depicts an example of propensity values, which may be produced by one or more components of the system of FIG. 1, for example propensity model 148, in an embodiment. In the experiment, a user data set of approximately 500 million users of an online system was used. For each user, propensity for digitally engaging with a category of digital content was modeled using the above-described techniques.

The plot of FIG. 4A shows a distribution of users over propensity values produced by a propensity model during experimentation. For each propensity value on the x-axis, a vertical bar plots the percentage of users in the user data set for which the propensity model produced that propensity value. For example, based on output of the propensity model, 1.27% of all users in the user data set were assigned a relatively high propensity value of 0.65 while 10.8% of all users in the user data set were assigned a relatively low propensity value of 0.1.

Automatic targeting component 138, for example, can use data such as the plot of FIG. 4A to identify users who are good candidates to be served a digital content item of the particular category used to create the propensity model. For instance, automatic targeting component 138 may compare a user's propensity value to a threshold propensity value, and serve a digital content item only to users having propensity values higher than the threshold value. Based on the comparison of the user's propensity value to the threshold propensity value, automatic targeting component 138 may determine not to serve any digital content items of the particular category used to create the propensity model to users having propensity values less than the threshold propensity value.

In an embodiment, the comparison of a user's propensity value to a threshold propensity value is performed programmatically; for example by a rule implemented using Boolean logic, where the threshold propensity value is set based on the requirements of a particular design or implementation of the system. The threshold propensity value may be a static, or constant value, or a dynamic, or variable value. An example of a static value is 0.6. An example of a dynamic value is a computed value such as the propensity value that is exceeded by the top 15% of all users for whom propensity values have been computed. A threshold propensity value may be received as an input or a parameter value, or may be indicated directly in computer code, for example as a result of configuration of the system for a particular application.

In either case, in some implementations, a further set of rules may be used to convert users' propensity values to propensity scores. For example if a user's propensity value exceeds the threshold propensity value, the system may assign a propensity score of 1 to the user; whereas if the user's propensity value is less than the threshold propensity value, the system may assign a propensity score of 0 to the user. The propensity score may then be used by an online system to quickly determine whether to serve digital content to the user. For instance, if a user's propensity score is 1, serve a digital content item to the user; if the user's propensity score is 0, do not serve a digital content item to the user.

Examples of Model Performance

Figure 4B:
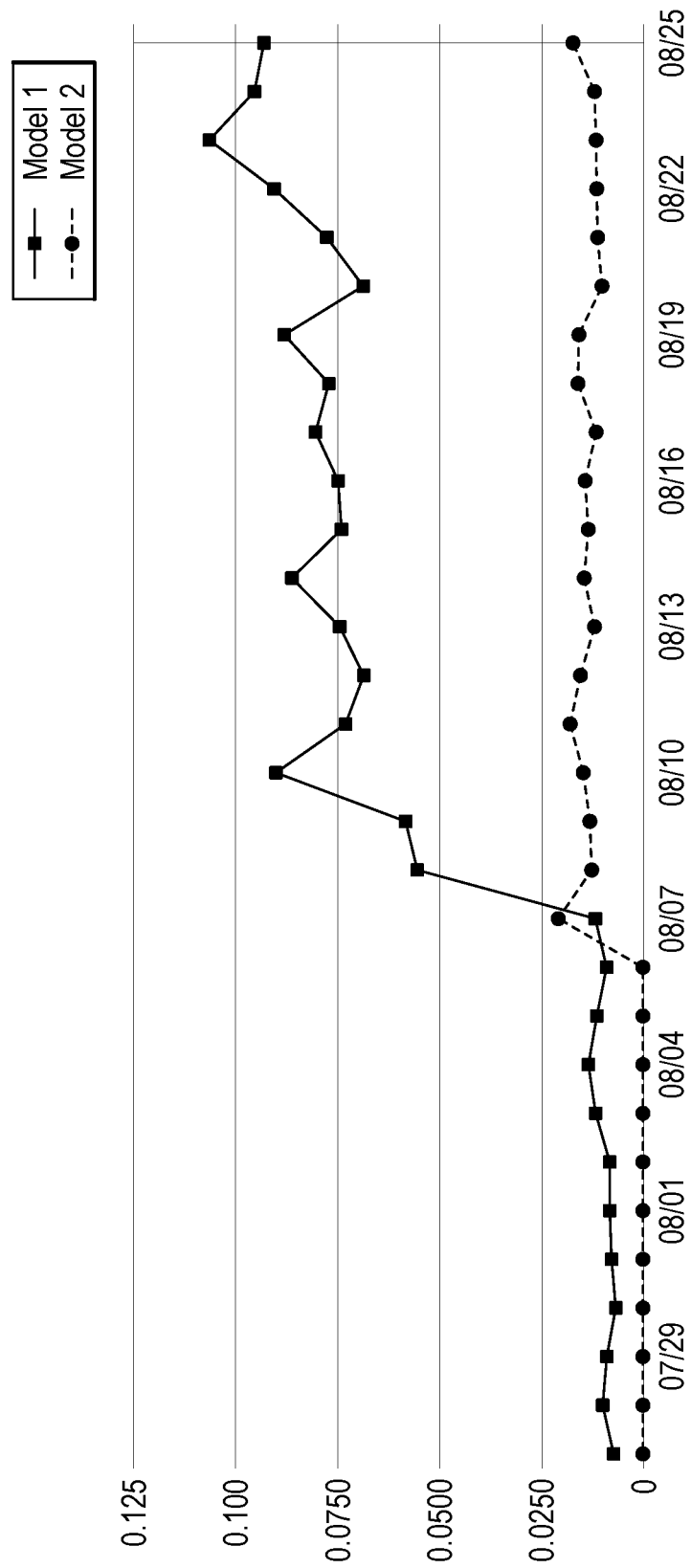
FIG. 4B is a plot that depicts an example of experimental results obtained using different models, which may be configured in accordance with the system of FIG. 1, in an embodiment.

FIG. 4B is a plot that depicts an example of experimental results obtained using two different models, which may be configured in accordance with the system of FIG. 1, in an embodiment. The plot of FIG. 4B was created as a result of AB testing a propensity model created as described herein against a random targeting approach. In the plot of FIG. 4B, Model 1 refers to the propensity model and Model 2 represents the random targeting approach.

The plot of FIG. 4B plots a success metric over time. Here, the success metric used was click-through rate, and a higher value on the y-axis corresponds to a better/improved click-through rate. Thus, the plot of FIG. 4B illustrates that the propensity model began to outperform the baseline model after having been trained using, for example, the last x months of historical training data obtained from either a random targeting model or a previous iteration of the propensity model, and continued to outperform the baseline model through the end of the experiment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
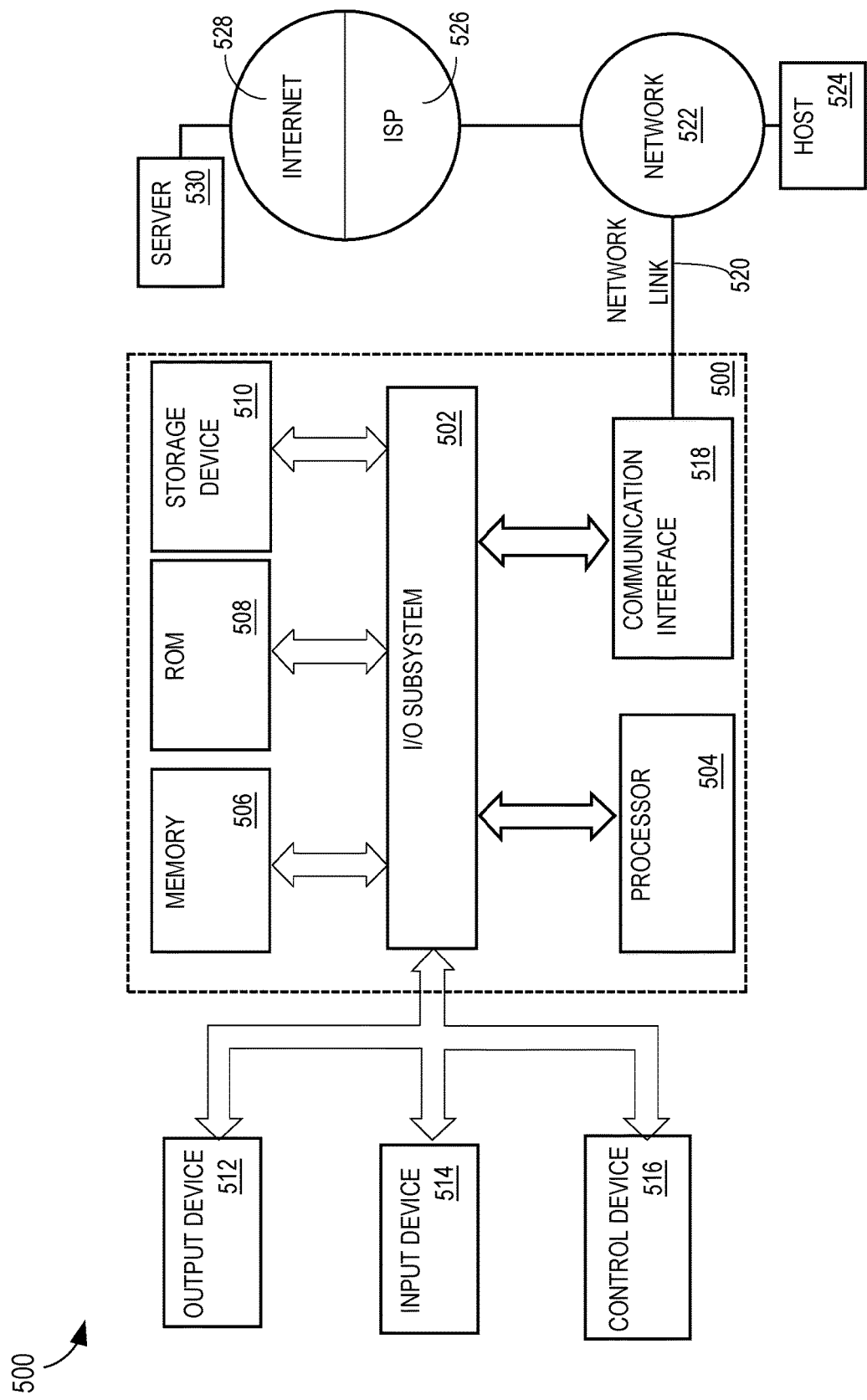
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM (compact disc-read only memory), any other optical data storage medium, any physical medium with patterns of holes, a RAM (random access memory), a PROM (programmable read-only memory), and EPROM (erasable programmable read-only memory), a FLASH-EPROM, NVRAM (non-volatile random access memory), any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the examples described below.

In an example 1, a method includes determining a digital identifier associated with a user of a network-based software application; computing, using aggregate digital event data obtained from at least one computing device associated with the network-based software application, digital feature data relating to the digital identifier; inputting the digital feature data relating to the digital identifier into a digital model that has machine-learned correlations between digital feature data and digital propensity prediction values relating to use of the online learning service; receiving, from the digital model, a predicted propensity value associated with the digital identifier; determining a propensity score based on the predicted propensity value; causing a digital content item relating to an online learning service that is operably coupled to the network-based software application to be displayed on a user interface of the network-based software application associated with the digital identifier only if the propensity score satisfies a propensity criterion. An example 2 includes the subject matter of example 1, further including computing, as part of the digital feature data, a count of digital events associated with at least one second digital identifier, where a second digital identifier of the at least one second digital identifier is associated with another user of the network-based software application who has used the online learning service, and at least one item of profile data associated with the second digital identifier by the network-based software application matches at least one item of profile data associated with the digital identifier by the network-based software application. An example 3 includes the subject matter of example 2, further including computing the count of digital events includes by computing a count of online courses digitally offered through the online learning service that have been digitally completed by at least one user associated with the at least one second digital identifier. An example 4 includes the subject matter of example 2, further including computing the count of digital events by computing a count of online courses digitally offered through the online learning service that have been digitally accessed by at least one user associated with the at least one second digital identifier. An example 5 includes the subject matter of any of examples 1-4, further including determining the propensity score associated with the digital identifier by converting the predicted propensity value to a binary value. An example 6 includes the subject matter of example 5, further including programmatically determining that the predicted propensity value associated with the digital identifier is greater than predicted propensity values associated with at least a majority of other users of the network-based software application. An example 7 includes the subject matter of any of examples 1-6, further including inputting digital training data into the digital model, where the digital training data includes digital event data collected during at least two different types of online experiments, where the at least two different types of online experiments include at least one of a random targeting experiment and a contextual unlocking experiment. An example 8 includes the subject matter of any of examples 1-7, further including programmatically validating the digital model using an A/B testing technique and training data sets that are not mutually exclusive, where the A/B testing technique has been configured for the training data sets that are not mutually exclusive. An example 9 includes the subject matter of any of examples 1-8, further including programmatically adjusting a model parameter of the digital model by decreasing a number of trees model parameter value or by decreasing a tree depth model parameter value. An example 10 includes the subject matter of any of examples 1-9, where the network-based software application includes an online connection network.

In an example 11, a system includes at least one processor; and at least one storage media storing instructions that, when executed by the at least one processor, cause: determining a digital identifier associated with a user of a network-based software application; computing, using aggregate digital event data obtained from at least one computing device associated with the network-based software application, digital feature data relating to the digital identifier; inputting the digital feature data relating to the digital identifier into a digital model that has machine-learned correlations between digital feature data and digital propensity prediction values relating to use of an online learning service; receiving, from the digital model, a predicted propensity value associated with the digital identifier; determining a propensity score based on the predicted propensity value; causing a digital content item relating to the online learning service to be displayed on a user interface of the network-based software application associated with the digital identifier only if the propensity score satisfies a propensity criterion.

An example 12 includes the subject matter of example 11, where the instructions, when executed by the at least one processor, further cause computing, as part of the digital feature data, a count of digital events associated with at least one second digital identifier, where a second digital identifier of the at least one second digital identifier is associated with another user of the network-based software application who has used the online learning service, and at least one item of profile data associated with the second digital identifier by the network-based software application matches at least one item of profile data associated with the digital identifier by the network-based software application. An example 13 includes the subject matter of example 12, where the instructions, when executed by the at least one processor, further cause computing the count of digital events by computing a count of online courses digitally offered through the online learning service that have been digitally completed by at least one user associated with the at least one second digital identifier. An example 14 includes the subject matter of example 12, where the instructions, when executed by the at least one processor, further cause computing the count of digital events by computing a count of online courses digitally offered through the online learning service that have been digitally accessed by at least one user associated with the at least one second digital identifier. An example 15 includes the subject matter of any of examples 11-14, where the instructions, when executed by the at least one processor, further cause determining the propensity score associated with the digital identifier by converting the predicted propensity value to a binary value. An example 16 includes the subject matter of example 15, where the instructions, when executed by the at least one processor, further cause programmatically determining that the predicted propensity value associated with the digital identifier is greater than predicted propensity values associated with at least a majority of other users of the network-based software application. An example 17 includes the subject matter of any of examples 11-16, where the instructions, when executed by the at least one processor, further cause inputting digital training data into the digital model, where the digital training data includes digital event data collected during at least two different types of online experiments, where the at least two different types of online experiments include at least one of a random targeting experiment and a contextual unlocking experiment. An example 18 includes the subject matter of any of examples 11-17, where the instructions, when executed by the at least one processor, further cause programmatically validating the digital model using an A/B testing technique and training data sets that are not mutually exclusive, where the A/B testing technique has been configured for the training data sets that are not mutually exclusive. An example 19 includes the subject matter of any of examples 11-18, where the instructions, when executed by the at least one processor, further cause programmatically adjusting a model parameter of the digital model by decreasing a number of trees model parameter value or by decreasing a tree depth model parameter value. An example 20 includes the subject matter of any of examples 11-19, where the network-based software application includes an online connection network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
   determining a digital identifier associated with a user of a network-based software application;
   computing digital feature data using digital event data associated with at least one other user of the network-based software application different from the user;
   creating a digital model by machine learning correlations between the digital feature data and digital propensity prediction values indicative of the at least one other user's use of an online learning service to take an online course;
   applying the digital model to the digital feature data;
   receiving, from the digital model, a predicted propensity value associated with the digital identifier;
   determining a propensity score based on the predicted propensity value;
   when the propensity score has a first value, including a digital content item relating to the online course in a user interface of the network-based software application associated with the digital identifier; and when the propensity score has a second value different from the first value, not including the digital content item relating to the online course in the user interface.

2. The method of claim 1, further comprising counting digital events associated with at least one second digital identifier, wherein a second digital identifier is associated with the at least one other user of the network-based software application who has used the online learning service, and at least one item of profile data associated with the second digital identifier by the network-based software application matches at least one item of profile data associated with the digital identifier by the network-based software application.

3. The method of claim 1, further comprising counting online courses digitally offered through the online learning service and digitally completed by at least one user associated with a second digital identifier.

4. The method of claim 1, further comprising counting online courses digitally offered through the online learning service and digitally accessed by the at least one other user associated with a second digital identifier.

5. The method of claim 1, further determining the propensity score associated with the digital identifier by converting the predicted propensity value to a binary value.

6. The method of claim 5, further comprising programmatically determining that the predicted propensity value associated with the digital identifier is greater than predicted propensity values associated with at least a majority of the at least one other user of the network-based software application.

7. The method of claim 1, further comprising collecting the digital event data during at least two different types of online experiments, wherein the at least two different types of online experiments include at least one of a random targeting experiment and a contextual unlocking experiment.

8. The method of claim 1, further comprising programmatically validating the digital model using an A/B testing technique and training data sets that are not mutually exclusive, and configuring the A/B testing technique for the training data sets that are not mutually exclusive.

9. The method of claim 1, further comprising programmatically adjusting a model parameter of the digital model by decreasing a number of trees model parameter value or by decreasing a tree depth model parameter value.

10. The method of claim 1, wherein the network-based software application comprises an online connection network.

11. A system, comprising:
at least one processor; and
at least one storage media storing instructions that, when executed by the at least one processor, cause:
determining a digital identifier associated with a user of a network-based software application;
computing digital feature data using digital event data associated with at least one other user of the network-based software application different from the user;
creating a digital model by machine learning correlations between the digital feature data and digital propensity prediction values indicative of the at least one other user's use of an online learning service;
applying the digital model to the digital feature data;

receiving, from the digital model, a predicted propensity value associated with the digital identifier;
determining a propensity score based on the predicted propensity value;
when the propensity score has a first value, including a digital content item relating to an online course in a user interface of the network-based software application associated with the digital identifier; and
when the propensity score has a second value different from the first value, not including the digital content item relating to the online course in the user interface.

12. The system of claim 11, wherein the instructions, when executed by the at least one processor, further cause counting digital events associated with a second digital identifier, wherein the second digital identifier is associated with another use of the network-based software application who has used the online learning service, and at least one item of profile data associated with the second digital identifier by the network-based software application matches at least one item of profile data associated with the digital identifier by the network-based software application.

13. The system of claim 12, wherein the instructions, when executed by the at least one processor, further cause counting online courses digitally offered through the online learning service and digitally completed by at least one user associated with a second digital identifier.

14. The system of claim 12, wherein the instructions, when executed by the at least one processor, further cause counting online courses digitally offered through the online learning service and digitally accessed by at least one user associated with a second digital identifier.

15. The system of claim 11, wherein the instructions, when executed by the at least one processor, further cause determining the propensity score associated with the digital identifier by converting the predicted propensity value to a binary value.

16. The system of claim 15, wherein the instructions, when executed by the at least one processor further cause programmatically determining that the predicted propensity value associated with the digital identifier is greater than predicted propensity values associated with at least a majority of other users of the network-based software application.

17. The system of claim 11, wherein the instructions, when executed by the at least one processor, further cause inputting digital training data into the digital model and collecting digital event data during at least two different types of online experiments, wherein the at least two different types of online experiments include at least one of a random targeting experiment and a contextual unlocking experiment.

18. The system of claim 11, wherein the instructions, when executed by the at least one processor, further cause programmatically validating the digital model using an A/B testing technique and training data sets that are not mutually exclusive and configuring the A/B testing technique for the training data sets that are not mutually exclusive.

19. The system of claim 11, wherein the instructions, when executed by the at least one processor, further cause programmatically adjusting a model parameter of the digital model by decreasing a number of trees model parameter value or by decreasing a tree depth model parameter value.

20. The system of claim 11, where in the network-based software application comprises an online connection network.

* * * * *